Oct. 16, 1928.

T. S. COLE 1,688,002

STORAGE CELL CONNECTER

Filed July 20, 1923

INVENTOR.
THEODORE S. COLE
BY
Stockbridge & Borst.
ATTORNEYS

Patented Oct. 16, 1928.

1,688,002

UNITED STATES PATENT OFFICE.

THEODORE S. COLE, OF NEW HAVEN, CONNECTICUT.

STORAGE-CELL CONNECTER.

Application filed July 20, 1923. Serial No. 652,704.

This invention relates to electrical connecters for secondary or storage cells, and particularly to the metallic connecters joining the negative electrode of one cell with the positive of another. A storage cell, like all electro-chemical cells, gradually looses its charge when standing on open circuit. In the dry cell type, this self discharge takes place primarily within the cell itself and very little, if any, inter-cell leakage occurs when a plurality of such cells are assembled into a battery. In storage cells the electrolyte, usually acid, will creep along and envelop the connecters, which are usually of lead, and it has been found that the loss of charge in such cells, when connected into a battery, is due largely, if not entirely, to this acid film upon the connecters. In the case of small lead and acid storage cells, the internal discharge and inter-cell leakage causes a comparatively rapid loss of charge when standing on open circuit. In cells of $\frac{1}{10}$ ampere hour capacity, for example, this inter-cell leakage has been sufficient to cause a complete discharge of the battery within a week or ten days. Many of the larger manufacturers of B storage batteries for radio work recommend that their batteries be charged every three or four weeks whether they are used or not. Attempts have been made to eliminate this loss of charge through leakage by coating the connecters with various substances such as asphaltum, paraffin, or compounds thereof, in order to prevent the formation of the acid film upon the lead connecters, but this has not been successful, due to the fact that the acid will, because of its high surface tension, force its way along the metal connecters beneath the coating.

An object of the invention is to provide an improved connecter for storage cells with which inter-cell leakage will be largely or entirely prevented, and which will be relatively simple, durable, and inexpensive.

Other objects and advantages will be apparent from the following description of an embodiment of the invention and the novel features will be particularly pointed out hereinafter in claims.

Figure 1:
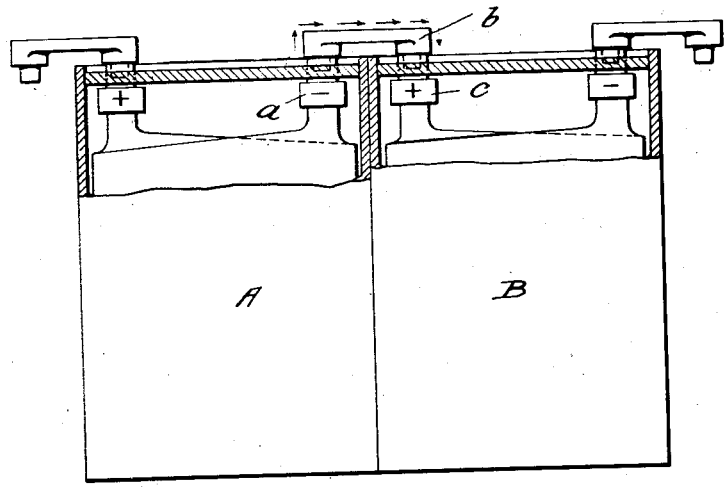
Figure 1 is an elevation of a pair of storage cells, schematically illustrated, with the ordinary lead connecter between electrodes of opposite polarity of the two cells.

Reference may now be had particularly to Figure 1, which shows two ordinary lead acid storage cells A and B having the negative electride $a$ of one cell A connected through an ordinary lead connecter $b$ to the positive electrode $c$ of the other cell B. As soon as these cells have stood for a short length of time, the acid electrolyte in the cells will creep along the electrodes and the connecter $b$, and form an acid film along and around the connecter. A thin layer of lead peroxide will also be formed upon the exposed surface of the connecter, the peroxide layer extending from the positive terminal of cell B nearly to the negative electrode of the cell A. The inter-cell leakage and consequent discharge of the connected electrodes in such cells has been found to be very rapid, and the leakage is believed to be due to the fact that the acid film on the connecter, together with the positive plate of cell B, the connecter, and the negative electrode of the cell A, form a short circuited cell in which the current flows through the acid film in the direction indicated by the small arrows shown along the connecter in Figure 1, the return flow of current being through the body of the connecter. It will be noted that this current flow is in such a direction as to cause a discharge of the positive electrode of the cell B and of the negative electrode of the cell A. The present invention relates to the prevention of this current and thereby the prevention of inter-cell leakage.

It is well known from physical chemistry that the various metals form an electrochemical series with respect to any given electrolyte. Measurements show that the majority of metals are electro-positive with respect to sponge lead (the negative electrode) in sulphuric acid solution, and that among the common metals only mercury and zinc are electro-negative to lead in the electromotive-over voltage series. In accordance with this invention, I propose to provide the inter-cell connecters with a surface layer, alloy, or coating of a material or metal which is electro-negative to the material of the negative electrode. Assuming that the connecters are of lead, as is usual in lead storage cells using an acid electrolyte, mercury or zinc for example, will be utilized to coat the connecter, although it will be understood that any other metal or alloy which is electro-negative to lead may be used. While theoretically the zinc coating will be very satisfactory, its use is not preferred owing to the fact that it is soluble in sulphuric acid and would soon go into solution into the electrolyte. Mercury, however, is substantially inert in sulphuric acid, and is therefore the preferred metal for use in coating or alloying with the entire body of the connecter. Accordingly I propose to amalgamate, coat or alloy the connecter with mercury, at least upon the surface thereof.

Figure 2:
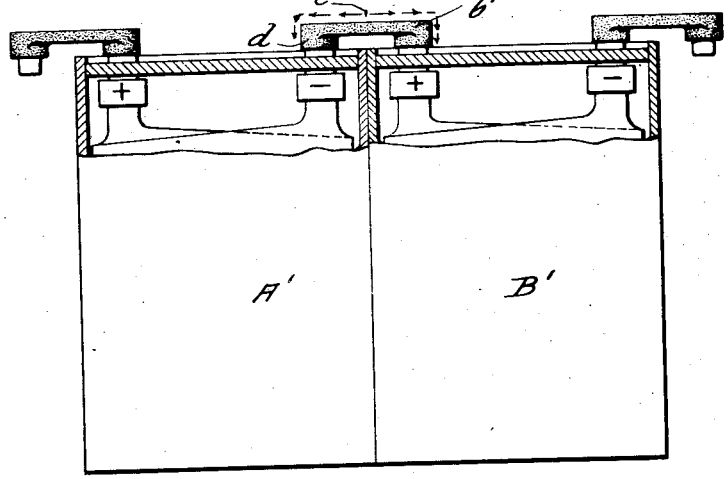
Figure 2 is a similar elevation, with a connecter between the cells constructed in accordance with this invention.
Figure 3:
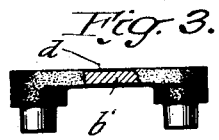
Figure 3 is an elevation of the connecter, detached and partly in section to better illustrate its construction.

In Figures 2 and 3 the connecter $b'$ is illustrated as provided with such an amalgamated surface layer or coating $d$. With such inter-cell connecters, the surface of minimum potential in the system will be transferred from the negative electrode to the surface of the connecter $b'$, and consequently the current tends to flow through the acid film in the direction shown by the arrows in Figure 2. Some point on the connecter, such as $e$, may be taken as the point of least potential in the system, and from this point the current will flow in opposite directions through the acid film, as shown by the arrows in Figure 2. It will be noted that the current now tends to flow in the charging direction at the negative electrode of cell $A'$ so that no loss of charge can now take place at this electrode from inter-cell leakage. The current still tends to flow in a discharge direction at the positive electrode of cell $B'$, but since there is no sponge lead available on the connecter to support the necessary chemical reaction, the current cannot flow in this direction. That is, in order that an energy transfer may take place, sponge lead must be available to the electrolyte in order to support the reaction which is similar to that occurring at the negative electrode. Therefore, it will be observed that with the coated connecter, no current can flow through the film in a direction to cause the discharge of the positive electrode of cell $B'$.

By demonstration, batteries of 20 volts and 80 milli-ampere hour capacity have stood on open circuit for six weeks or more, without any appreciable inter-cell leakage when connected by connecters constructed in accordance with this invention.

It will be obvious that the connecters may be formed of various other combinations of materials in which the coating is electro-negative to the material of which the negative electrode is made, and that various changes in the other details herein described and illustrated for the purpose of explaining the nature of the invention, may be made by those skilled in the art within the principle and scope of the invention as expressed in the appended claims.

I claim:

1. A connecter for lead storage cells comprising a body of lead having a mercury covered surface.

2. A connecter for storage cells having upon its surface an alloy composed of at least 10% mercury and the remainder lead.

3. In a storage battery system, a plurality of cells each thereof having negative and positive plates therein, comprising lead frames and active material, and a lead connecter bridge between adjacent cells, connected to positive plates in one cell and negative plates in another cell as by fusion thereto, and having a layer of lead-mercury amalgam on the surface thereof.

In witness whereof, I hereunto subscribe my signature.

THEODORE S. COLE.